United States Patent
Hwang et al.

(10) Patent No.: US 12,257,747 B2
(45) Date of Patent: Mar. 25, 2025

(54) SECONDARY BATTERY COMPRISING INJECTION-MOLDED BATTERY CASE

(71) Applicant: LG Chem, Ltd., Seoul (KR)

(72) Inventors: Soo Ji Hwang, Daejeon (KR); Yong Su Choi, Daejeon (KR); Sang Hun Kim, Daejeon (KR); Hyung Kyun Yu, Daejeon (KR); Na Yoon Kim, Daejeon (KR); Min Hyeong Kang, Daejeon (KR); Yong Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 813 days.

(21) Appl. No.: 16/604,359

(22) PCT Filed: Jul. 5, 2018

(86) PCT No.: PCT/KR2018/007615
§ 371 (c)(1),
(2) Date: Oct. 10, 2019

(87) PCT Pub. No.: WO2019/088398
PCT Pub. Date: May 9, 2019

(65) Prior Publication Data
US 2020/0168855 A1    May 28, 2020

(30) Foreign Application Priority Data
Oct. 31, 2017    (KR) .................. 10-2017-0143675

(51) Int. Cl.
*H01M 50/121* (2021.01)
*B29C 45/00* (2006.01)
(Continued)

(52) U.S. Cl.
CPC .......... *B29C 45/14* (2013.01); *B29C 45/0001* (2013.01); *H01M 50/121* (2021.01);
(Continued)

(58) Field of Classification Search
CPC .. H01M 50/116; H01M 50/10; H01M 50/121; H01M 50/183
See application file for complete search history.

(56) References Cited

U.S. PATENT DOCUMENTS 3,443,994 A * 5/1969 Tamminen .............. H01M 6/10
429/81
4,214,045 A * 7/1980 Jutte ................... H01M 50/308
429/87
(Continued)

FOREIGN PATENT DOCUMENTS

CN          1989633 A     6/2007
CN          102315398 A   1/2012
(Continued)

OTHER PUBLICATIONS

Extended European Search Report including Written Opinion for Application No. EP18872993.3, dated Aug. 4, 2020, pp. 1-6.
(Continued)

*Primary Examiner* — Imran Akram
(74) *Attorney, Agent, or Firm* — Lerner David LLP

(57) ABSTRACT

A secondary battery configured to have a structure in which an electrode assembly is received in a battery case together with an electrolytic material, wherein the battery case is provided therein with a space for receiving the electrode assembly and wherein the battery case is made of a thermoplastic resin, which can be injection-molded. An injection mold may be formed such that the size of the mold corresponds to the thickness of the electrode, thereby solving a problem in which the formability of a conventional laminate sheet including a metal layer is low. In addition, a process of forming the laminate sheet and a process of sealing the battery case using a pressing member, which are essentially required in order to use the laminate sheet, may be omitted, (Continued)

whereby a manufacturing process is simplified and thus productivity is improved.

8 Claims, 5 Drawing Sheets

(51) Int. Cl.
*B29C 45/14* (2006.01)
*B29K 101/10* (2006.01)
*H01M 50/131* (2021.01)
*H01M 50/166* (2021.01)
*B29K 101/12* (2006.01)
*B29L 31/34* (2006.01)
*H01M 50/103* (2021.01)
*H01M 50/105* (2021.01)
*H01M 50/119* (2021.01)
*H01M 50/124* (2021.01)

(52) U.S. Cl.
CPC ....... *H01M 50/131* (2021.01); *H01M 50/166* (2021.01); *B29K 2101/12* (2013.01); *B29K 2995/0092* (2013.01); *B29L 2031/3468* (2013.01); *H01M 50/103* (2021.01); *H01M 50/105* (2021.01); *H01M 50/119* (2021.01); *H01M 50/124* (2021.01)

(56) References Cited

U.S. PATENT DOCUMENTS

| | | | |
|---|---|---|---|
| 4,509,253 A * | 4/1985 | Eberle | H01M 50/528 29/730 |
| 5,510,203 A | 4/1996 | Hamada et al. | |
| 6,312,851 B1 * | 11/2001 | Fukuda | H01M 10/625 429/57 |
| 10,008,699 B2 | 6/2018 | Kuramoto et al. | |
| 2003/0141841 A1 | 7/2003 | Kawabata et al. | |
| 2004/0137320 A1 | 7/2004 | Komori et al. | |
| 2006/0068281 A1 | 3/2006 | Hiratsuka et al. | |
| 2007/0287063 A1 | 12/2007 | Hiratsuka et al. | |
| 2010/0209764 A1 | 8/2010 | Heo et al. | |
| 2012/0015226 A1 | 1/2012 | Kim et al. | |
| 2012/0060361 A1 * | 3/2012 | Reis | H01M 50/129 29/623.5 |
| 2012/0121968 A1 * | 5/2012 | Nakagawa | H01M 10/0587 429/163 |
| 2012/0141851 A1 * | 6/2012 | Hou | H01M 50/222 429/96 |
| 2013/0183561 A1 * | 7/2013 | Laitinen | H01M 50/227 429/100 |
| 2014/0220415 A1 * | 8/2014 | Lim | H01M 50/209 429/156 |
| 2016/0111750 A1 * | 4/2016 | Tanida | H01M 50/119 29/623.2 |
| 2016/0197386 A1 * | 7/2016 | Moon | H01M 10/613 429/120 |
| 2016/0276678 A1 * | 9/2016 | Jorgensen | G02C 7/083 |
| 2017/0069892 A1 * | 3/2017 | Bohney | H01M 50/204 |
| 2017/0162920 A1 * | 6/2017 | Karpinski | H01M 50/55 |
| 2017/0194606 A1 | 7/2017 | Lim et al. | |
| 2017/0256829 A1 * | 9/2017 | Hsu | H01M 10/6551 |
| 2017/0309951 A1 * | 10/2017 | Ishikawa | H01M 50/586 |
| 2018/0040864 A1 * | 2/2018 | Rejman | H01M 50/51 |
| 2018/0047957 A1 * | 2/2018 | Newman | H01M 50/213 |
| 2020/0006722 A1 * | 1/2020 | Tanner | H01M 10/6556 |
| 2024/0347834 A1 * | 10/2024 | Wolf | H01M 50/231 |

FOREIGN PATENT DOCUMENTS

| | | | | |
|---|---|---|---|---|
| CN | 203521532 U | | 4/2014 | |
| EP | 1053763 A2 | | 11/2000 | |
| EP | 2367218 A1 | | 9/2011 | |
| JP | H06203815 A | | 7/1994 | |
| JP | H07235326 A | | 9/1995 | |
| JP | H11191400 A | | 7/1999 | |
| JP | 2000106154 A | | 4/2000 | |
| JP | 2002190295 A | | 7/2002 | |
| JP | 2002319382 A | | 10/2002 | |
| JP | 2004031167 A | | 1/2004 | |
| JP | 2004087359 A | | 3/2004 | |
| JP | 2006156049 A | | 6/2006 | |
| JP | 2011204589 A | | 10/2011 | |
| JP | 2014203626 A | | 10/2014 | |
| JP | 2016062746 A | | 4/2016 | |
| KR | 100670472 B1 | | 1/2007 | |
| KR | 100889203 B1 | | 3/2009 | |
| KR | 101084801 B1 | | 11/2011 | |
| KR | 101089168 B1 | | 12/2011 | |
| KR | 2016077663 A | * | 7/2016 | ............ H01M 10/04 |
| KR | 20160077663 A | | 7/2016 | |
| KR | 20160128835 A | | 11/2016 | |
| KR | 101684321 B1 | * | 12/2016 | |
| KR | 20170004858 A | | 1/2017 | |
| WO | 2004055924 A1 | | 7/2004 | |
| WO | 2016175444 A1 | | 11/2016 | |

OTHER PUBLICATIONS

Search Report dated Mar. 18, 2022 from the Office Action for Chinese Application No. 201880014294.X issued Mar. 23, 2022, 3 pages.
International Search Report from Application No. PCT/KR2018/007615 mailed Oct. 16, 2018, pp. 1-2.
Chinese Search Report for Application No. 201880014294.X, dated Aug. 2, 2021, 2 pages.
Yang, L. et al., "Polymer Materials" May 2016, Retrieved from the Internet on Apr. 25, 2023, pp. 1-9.
Colin, T. Xingcun, " Advanced Materials for Thermal Management of Electronic Packaging" Springer Science & Business Media, Technology & Engineering, Jan. 2011, pp. 1-5.

* cited by examiner

[FIG. 1]
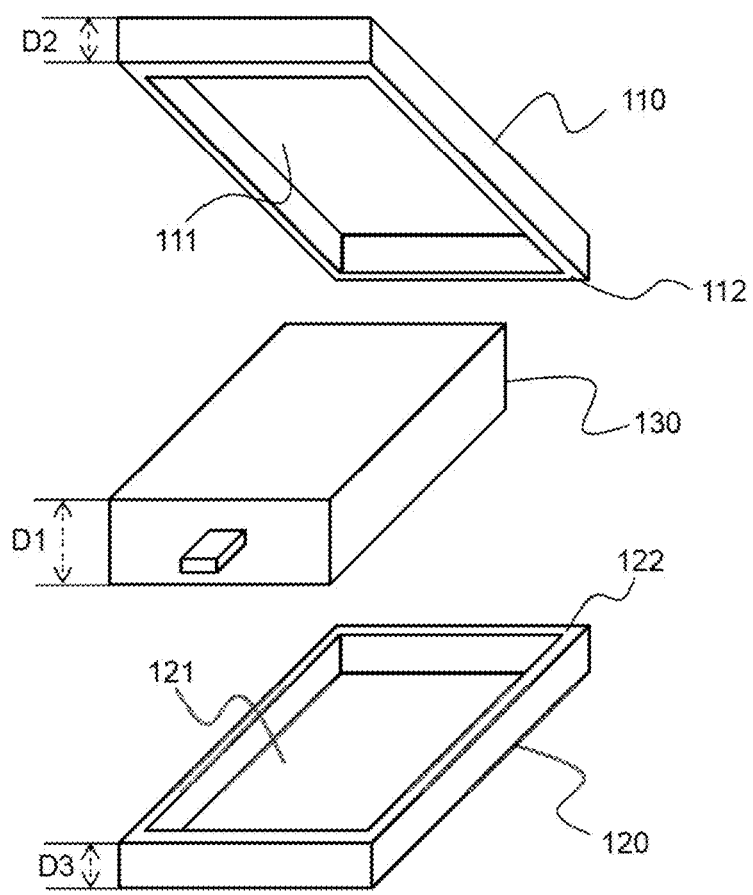

[FIG. 2]
200
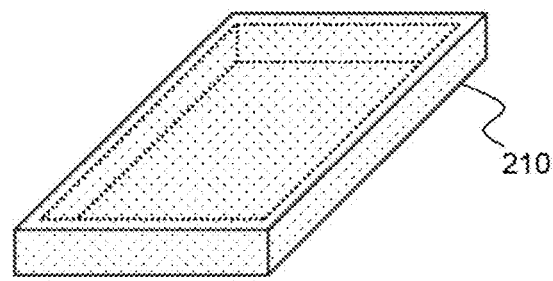
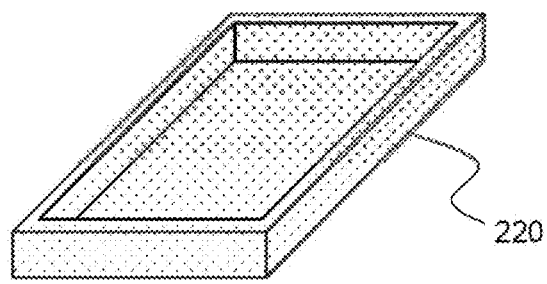

[FIG. 3]
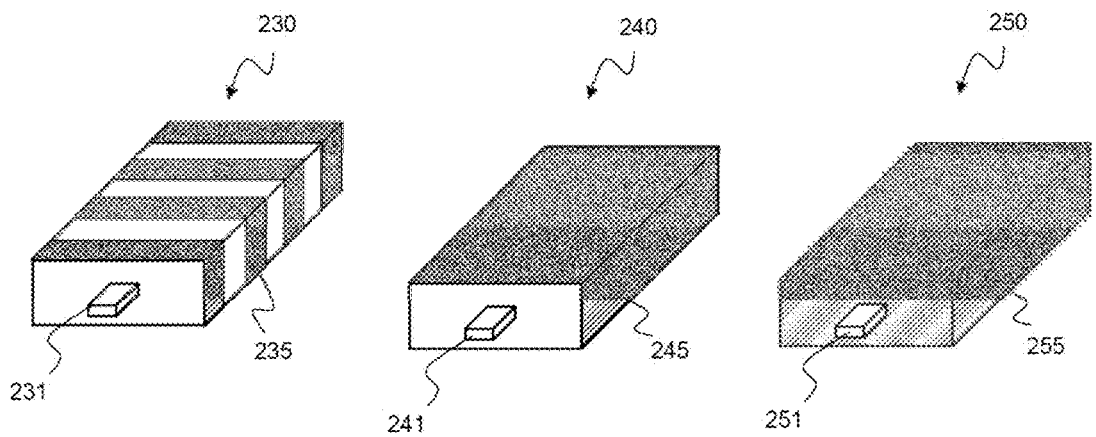
[FIG. 4]
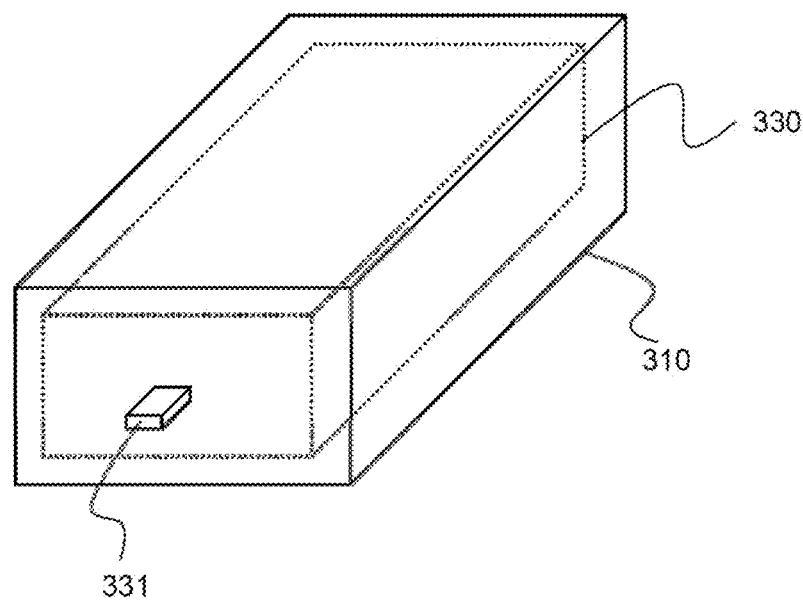

[FIG. 5]
400
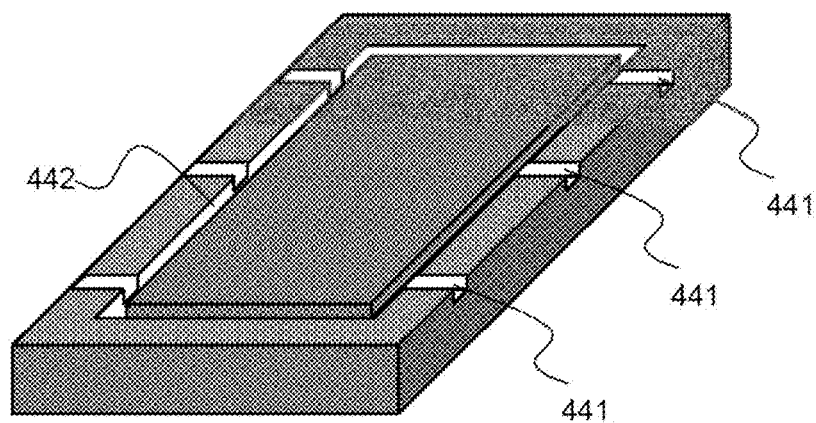

[FIG. 6]
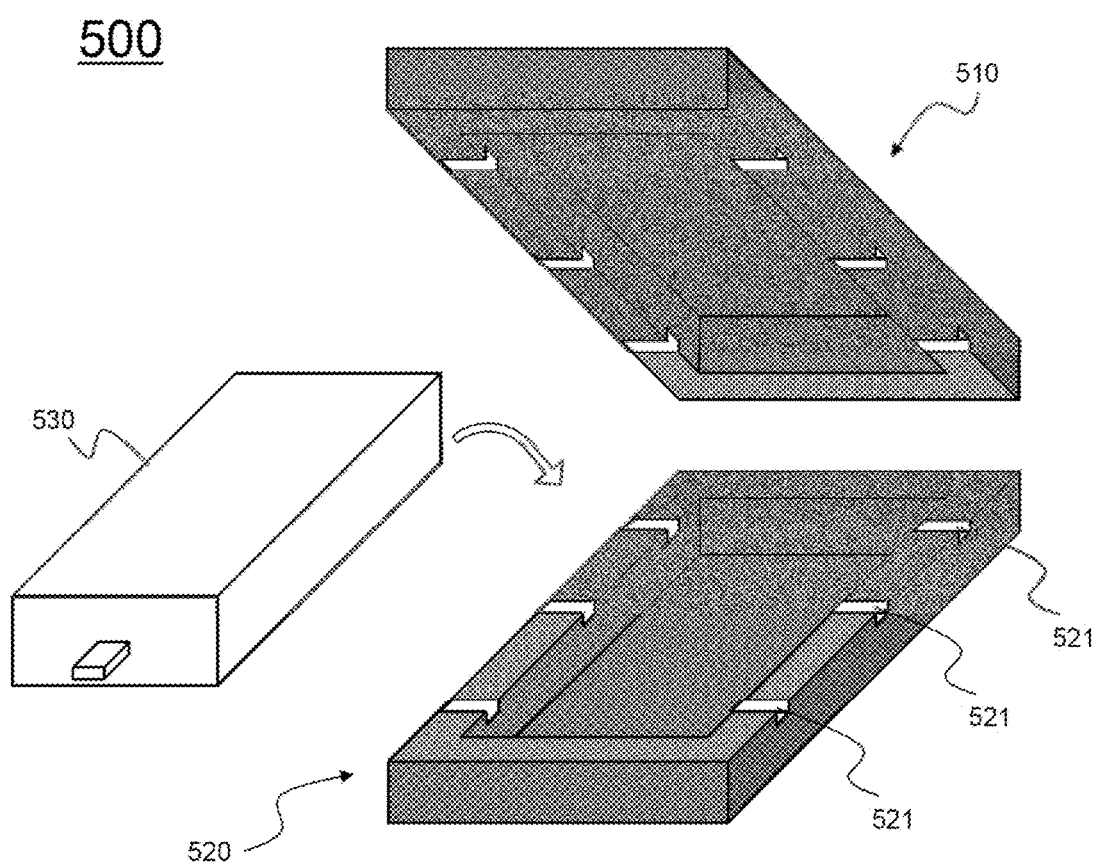

SECONDARY BATTERY COMPRISING INJECTION-MOLDED BATTERY CASE

CROSS-REFERENCE TO RELATED APPLICATIONS

This application is a national phase entry under 35 U.S.C. § 371 of International Application No. PCT/KR2018/007615, filed Jul. 5, 2018, published in Korean, which claims the benefit of Korean Patent Application No. 10-2017-0143675 filed on Oct. 31, 2017 with the Korean Intellectual Property Office, the disclosures of which are herein incorporated by reference in their entirety.

TECHNICAL FIELD

The present invention relates to a secondary battery including an injection-molded battery case, and more particularly to a secondary battery configured to have a structure in which an electrode assembly is received in a battery case together with an electrolytic material, wherein the battery case, which is provided therein with a space for receiving the electrode assembly, is made of a thermoplastic resin, which can be injection-molded.

BACKGROUND ART

Lithium secondary batteries are used as energy sources for various kinds of devices. Lithium secondary batteries are widely used in large-sized devices, such as electric vehicles, as well as small-sized mobile devices, such as smartphones. Lithium secondary batteries are classified into a cylindrical battery, a prismatic battery, and a pouch-shaped battery depending on the shape of a battery case thereof. Each of the cylindrical battery and the prismatic battery is a battery configured to have a structure in which an electrode assembly is mounted in a metal can, and the pouch-shaped battery is a battery configured to have a structure in which an electrode assembly is mounted in a pouch-shaped battery case made of an aluminum laminate sheet. Among these batteries, the pouch-shaped battery, which can be stacked with high integration, has high energy density per unit weight, is inexpensive, and can be easily modified, has attracted considerable attention.

In the case of the pouch-shaped battery, the electrode assembly is received in the aluminum laminate sheet. In the case in which the capacity of the battery is increased, the thickness of the electrode assembly is also increased. In the case in which there is insufficient space in which to mount the battery, there is no alternative but to reduce the thickness of the battery case. In the case in which the thickness of the aluminum laminate sheet is reduced, the formability of the aluminum laminate sheet is also reduced. As a result, it is difficult to increase the depth of an electrode assembly reception unit.

Meanwhile, the rigidity of the aluminum laminate sheet is lower than that of a metal can-type battery case. As a result, the aluminum laminate sheet has low resistance to external impacts, and it is difficult to fix the aluminum laminate sheet so as to have a uniform shape.

In connection therewith, Korean Registered U.S. Pat. No. 1,089,168 discloses a pouch-shaped lithium secondary battery including a first resin-type packing material for packing an electrode assembly in the form of a unit cell, the first resin type packing material being configured to have a two-layered structure including an inner resin layer and an outer resin layer, and a second metal-type packing material for simultaneously packing two or more unit cells, individually packed using the first packing material, in the form of a module.

The pouch-shaped lithium secondary battery disclosed in Korean Registered U.S. Pat. No. 1,089,168 uses a resin type packing material including an inner resin layer and an outer resin layer, which form a layered structure. In the case in which a laminate sheet including aluminum is used as a battery case of a general pouch-shaped secondary battery, it is possible to prevent a reduction in the insulation characteristics of the battery case due to the exposure of the aluminum layer. However, it is not possible for the battery case to sufficiently prevent foreign matter, such as moisture, from being introduced thereinto. In addition, a process of coupling different layers constituting a multi-layered structure is required, whereby the process is complicated.

In addition, Korean Registered U.S. Pat. No. 1,084,801 discloses a method of mounting a core pack in a mold and injecting a molten resin into an injection-molding device to manufacture a secondary battery. The core pack disclosed in Korean Registered U.S. Pat. No. 1,084,801 is configured to have a structure including a pouch-shaped bare cell and a protection circuit module connected to the bare cell. Since the secondary battery disclosed in Korean Registered U.S. Pat. No. 1,084,801 is configured to have a structure in which an electrode assembly is received in a pouch-shaped battery case, however, this patent does not suggest a solution to improve the formability of the battery case.

Korean Registered U.S. Pat. No. 889,203 discloses a resin mold-type secondary battery configured to have a structure in which, in the state in which a safety device including a protection circuit is coupled to a bare cell including a pouch-shaped battery case, in which an electrode assembly is mounted, both the bare cell and the protection circuit are covered with a resin mold. Since the secondary battery disclosed in Korean Registered U.S. Pat. No. 889,203 is configured to have a structure in which the bare cell, in which the electrode assembly is mounted in the pouch-shaped battery case, is covered with the resin mold, however, this patent does not solve the problem with the conventional art.

That is, a secondary battery including a thin pouch-shaped battery case that is capable of receiving an electrode assembly having a relatively large thickness while solving the problem of poor formability thereof has not yet been suggested.

DISCLOSURE

Technical Problem

The present invention has been made in view of the above problems and other technical problems that have yet to be resolved, and it is an object of the present invention to provide a battery case in which an electrode assembly is received together with an electrolytic material, wherein the battery case is provided therein with a space for receiving the electrode assembly. Specifically, the present invention provides a battery case that is capable of receiving an electrode assembly having a thickness increased in order to increase the capacity of a battery while solving the problem of poor formability thereof and a method of manufacturing the same.

Technical Solution

In accordance with an aspect of the present invention, the above and other objects can be accomplished by the provision of a secondary battery configured to have a structure in which an electrode assembly is received in a battery case together with an electrolytic material, wherein the battery case is provided therein with a space for receiving the electrode assembly and wherein the battery case is made of a thermoplastic resin, which can be injection-molded.

In the case in which a conventional laminate sheet including a metal layer, such as an aluminum layer, is used as a pouch-shaped battery case, it is not possible for the laminate sheet to effectively protect the electrode assembly from external impacts, and it is difficult to fix the laminate sheet so as to have a uniform shape, since the rigidity of the laminate sheet is lower than that of a metal can-type battery case.

In addition, as the demand for a high-output, large-capacity secondary battery increases, the thickness of the electrode assembly has been increased. Furthermore, the depth of a reception unit for receiving the electrode assembly has also been increased in order to receive the thickened electrode assembly.

Meanwhile, in the case in which a large-capacity secondary battery is manufactured without increasing the thickness of the secondary battery, the thickness of the electrode assembly is increased, and the thickness of the battery case is decreased. In the case in which the thickness of the battery case is decreased, it is even more difficult to increase the depth of the reception unit.

In the case in which a laminate sheet is used as a battery case in order to manufacture a conventional pouch-shaped secondary battery, as described above, the safety and the formability of the battery case become an issue due to the low rigidity of the battery case.

In the case in which a battery case made of a thermoplastic resin, which can be injection-molded, is used, as in the present invention, however, the thermoplastic resin is injected into a mold for injection molding having a size corresponding to the thickness of the electrode assembly in order to manufacture a battery case. Consequently, it is possible to easily manufacture a battery case having a deep electrode assembly reception unit formed therein.

In addition, a process of forming a space for receiving the electrode assembly and a process of sealing the battery case using a pressing member are not required, whereby a process of manufacturing the secondary battery may be simplified and thus the productivity of the secondary battery may be improved.

In a concrete example, the battery case may include an upper case and a lower case. After the upper case and the lower case are formed individually, the electrode assembly and the electrolytic material are received in the upper case and the lower case, and the upper case and the lower case are sealed.

For example, since the battery case is made of a thermoplastic resin, the upper case and the lower case may be sealed by thermal fusion, ultrasonic fusion, or laser fusion.

That is, corresponding portions of the upper case and the lower case that face each other may be sealed by thermal fusion, ultrasonic fusion, or laser fusion.

In another concrete example, the battery case may be configured to have an integrated structure by injection molding. In the case in which a thermoplastic resin is injected into a mold for injection molding in the state in which the electrode assembly is placed in the mold, it is possible to manufacture a battery case having a structure in which the thermoplastic resin surrounds the entire outer surface of the electrode assembly. This battery case may be configured to have an integrated structure in which the battery case has no seam on the outer surface thereof. Consequently, a process of coupling the upper case and the lower case, which are separate from each other, to each other, as described above, is not required.

In the secondary battery according to the present invention, the battery case is made of a thermoplastic resin, which can be injection-molded. In this case, it is necessary to supplement the function of a moisture barrier performed by a metal layer included in a conventional laminate sheet. Consequently, the battery case of the present invention may be made of a thermoplastic resin comprising a hygroscopic additive in order to prevent the performance of the secondary battery from being reduced by moisture introduced thereinto from the outside.

Alternatively, the secondary battery according to the present invention may be configured to have a structure in which an aluminum tape surrounds at least a portion of the surface of the electrode assembly in order to protect the electrode assembly from foreign matter, including moisture. For example, an aluminum tape may be attached to the outer side surfaces of the electrode assembly, excluding the outer end surfaces of the electrode assembly from which electrode terminals protrude. Alternatively, an aluminum tape may be attached to the entire outer surface of the electrode assembly in order to prevent moisture from permeating into the entirety of the electrode assembly.

In the case in which the battery case has a separable structure including an upper case and a lower case, it is possible to manufacture a secondary battery through processes of receiving the electrode assembly and an electrolytic material into the battery case and sealing the battery case after the battery case is formed. The electrolytic material may be liquid, which may be injected into the battery case.

Alternatively, in the case in which the battery case is configured to have an integrated structure by injection molding, the battery case is formed so as to surround the entire outer surface of the electrode assembly in the state in which the electrode assembly is placed in a mold. In this case, it is not possible to inject a liquid electrolytic material. Consequently, the electrolytic material may be solid, and the solid electrolytic material may constitute the electrode assembly.

The thermoplastic resin may be at least one selected from the group consisting of polyvinyl alcohol, polyethylene, polypropylene, polystyrene, acrylonitrile butadiene styrene copolymer (ABS), polyamide, polyvinyl chloride, acryl, fluorine resin, and polyethylene terephthalate.

In accordance with another aspect of the present invention, there is provided a method of manufacturing the secondary battery.

A method of manufacturing a secondary battery according to an embodiment of the present invention may include (a) preparing a mold for manufacturing a battery case having therein a space for receiving an electrode assembly, (b) injecting a thermoplastic resin into the mold to individually form an upper case and a lower case, (c) placing an electrode assembly in the upper case and the lower case separated from the mold, coupling the upper case and the lower case to each other to constitute the battery case, and injecting an electrolytic material into the battery case, and (d) sealing coupled portions of the battery case by fusion.

In this method of manufacturing the secondary battery, a separable battery case including an upper case and a lower case is used. The electrode assembly is placed in the injection-molded battery case, the electrolytic material is into injected the battery case, and corresponding portions of the upper case and the lower case that face each other are coupled to each other.

A method of manufacturing a secondary battery according to another embodiment of the present invention may include (a) preparing a mold for manufacturing a battery case having therein a space for receiving an electrode assembly, (b) placing an electrode assembly in the mold, (c) injecting a thermoplastic resin into the mold, in which the electrode assembly is placed, to form the battery case having the electrode assembly placed therein, and (d) separating the battery case from the mold.

In this method of manufacturing the secondary battery, a battery case having an integrated structure is manufactured. Before the battery case is formed, a thermoplastic resin is injected into the mold in the state in which the electrode assembly is placed in the mold for forming the battery case such that the battery case is formed on the entire outer surface of the electrode assembly.

In this case, an additional process of coupling the upper case and the lower case, which are separate from each other, to each other, as described above, is not required.

The thermoplastic resin used in each of the above manufacturing methods may include a hygroscopic additive, which may absorb moisture generated in the battery, thereby preventing a decrease in the performance of the electrode assembly.

In addition, the electrode assembly used in each of the above manufacturing methods may be configured to have a structure in which an aluminum tape surrounds at least a portion of the surface of the electrode assembly. Compared to the case in which a conventional laminate sheet including a metal layer is used as the battery case, it is possible to solve a problem in which the introduction of foreign matter thereinto is not effectively prevented.

The thermoplastic resin may be at least one selected from the group consisting of polyvinyl alcohol, polyethylene, polypropylene, polystyrene, acrylonitrile butadiene styrene copolymer (ABS), polyamide, polyvinyl chloride, acryl, fluorine resin, and polyethylene terephthalate.

In the method of manufacturing the battery case having the integrated structure, the electrode assembly is placed in the mold for forming the battery case, and the thermoplastic resin is injected into the mold, in which the electrode assembly is placed, in order to manufacture the battery case having the electrode assembly provided therein. The secondary battery manufactured as described above may be an all-solid-state battery using a solid electrolyte as the electrolytic material.

Consequently, the electrode assembly does not use an additional separator, and may be configured to have a structure in which a solid electrolyte is interposed between a positive electrode and a negative electrode.

In accordance with other aspects of the present invention, there are provided a battery pack including two or more secondary batteries as unit cells and a device including the battery pack as a power source.

The battery pack may be used as a power source for a device requiring the ability to withstand high temperatures, a long lifespan, high rate characteristics and the like. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is an exploded perspective view showing a secondary battery according to an embodiment of the present invention.

FIG. 2 is an exploded perspective view showing a battery case according to an embodiment of the present invention.

FIG. 3 is a series of perspective views showing electrode assemblies according to a plurality of embodiments of the present invention.

FIG. 4 is a perspective view showing a secondary battery according to another embodiment of the present invention.

FIG. 5 is a perspective view showing a mold for manufacturing the secondary battery of FIG. 1.

FIG. 6 is a perspective view showing a mold for manufacturing the secondary battery of FIG. 4.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is an exploded perspective view showing a secondary battery according to an embodiment of the present invention.

Referring to FIG. 1, the secondary battery, denoted by reference numeral 100, includes a battery case made of a thermoplastic resin, which can be injection-molded, the battery case including an upper case 110 and a lower case 120. The upper case 110 is provided with a reception unit 111 for receiving an electrode assembly 130, and the lower case 120 is provided with a reception unit 121 for receiving the electrode assembly 130. The electrode assembly 130 is disposed in the reception units 111 and 121 together with an electrolytic material. The sum of the height D2 of the reception unit 111 and the height D3 of the reception unit 121 is equal to or greater than the thickness D1 of the electrode assembly 130.

In the state in which the electrode assembly 130 is received in the upper case 110 and the lower case 120, the outer edge 112 of the reception unit of the upper case 110 and the outer edge 122 of the reception unit of the lower case 120 are located so as to face each other. The outer edges 112 and 122 are sealed by thermal fusion, ultrasonic fusion, or laser fusion.

FIG. 2 is an exploded perspective view showing a battery case according to an embodiment of the present invention.

Referring to FIG. 2, the battery case, denoted by reference numeral 200, is a separable battery case including an upper case 210 and a lower case 220, as in the battery case shown in FIG. 1. The battery case 200 is made of a thermoplastic resin, which can be injection-molded. The thermoplastic resin includes a hygroscopic additive.

FIG. 3 is a series of perspective views schematically showing three kinds of electrode assemblies.

Referring to FIG. 3, each of the electrode assemblies, denoted by reference numerals 230, 240, and 250, may be a jelly-roll type (wound type) electrode assembly, which is configured to have a structure in which long sheet type positive electrodes and long sheet type negative electrodes are wound in the state in which separators are interposed respectively between the positive electrodes and the negative electrodes, a stacked type electrode assembly, which is configured to have a structure in which a plurality of positive electrodes cut so as to have a predetermined size and a plurality of negative electrodes cut so as to have a predetermined size are sequentially stacked in the state in which separators are interposed respectively between the positive electrodes and the negative electrodes, a stacked/folded type electrode assembly, which is configured to have a structure in which bi-cells or full cells, each of which is configured to have a structure in which predetermined numbers of positive electrodes and negative electrodes are stacked in the state in which separators are disposed respectively between the positive electrodes and the negative electrodes, are wound using a separation sheet, or a laminated/stacked type electrode assembly, which is configured to have a structure in which bi-cells or full cells are stacked and laminated in the state in which separators are disposed respectively between the bi-cells or the full cells.

In addition, each of the electrode assemblies, denoted by reference numerals 230, 240, and 250, may be an electrode assembly that constitutes an all-solid-state battery. Each of the electrode assemblies may be configured to have a structure in which a solid electrolyte is interposed between a positive electrode and a negative electrode.

The electrode assembly 230, 240, or 250 is shown as having a structure in which electrode terminals 231, 241, or 251 protrude in different directions. Alternatively, the electrode terminals may protrude in one direction.

An aluminum tape may be attached to at least a portion of the outer surface of each of the electrode assemblies 230, 240, and 250 in order to prevent moisture from permeating into the electrode assembly. An aluminum tape 235 having a linear pattern is attached to the electrode assembly 230. An aluminum tape 245 is attached to the side surfaces of the electrode assembly 240 so as to surround the side surfaces of the electrode assembly, excluding the end surfaces of the electrode assembly from which the electrode terminals 241 protrude. An aluminum tape 255 is attached to the entire outer surface of the electrode assembly 250 including the end surfaces of the electrode assembly from which the electrode terminals protrude.

FIG. 4 is a perspective view showing a secondary battery according to another embodiment of the present invention.

Referring to FIG. 4, the secondary battery, denoted by reference numeral 300, is configured to have an integrated structure in which an electrode assembly 330 is received in a battery case 310, in which only electrode terminals 331 protrude outwards from the battery case, and in which the battery case 310 has no seam on the outer surface thereof.

The electrode assembly 330 included in the secondary battery 300 is configured to have a structure in which a solid electrolyte is interposed between a positive electrode and a negative electrode. No liquid electrolytic solution is used. Consequently, the secondary battery is an all-solid-state battery, all components of which are solid.

The secondary battery 300 is manufactured by injecting a thermoplastic resin into a mold for forming a battery case in the state in which the electrode assembly is placed in the mold.

FIG. 5 is a perspective view showing a mold for manufacturing a separable secondary battery as shown in FIG. 1.

Referring to FIG. 5, the mold, denoted by reference numeral 400, is provided with a concave unit 442 having a size and shape corresponding to the size and the shape of an upper case or a lower case. In addition, the mold is provided with a plurality of injection ports 441, through which a thermoplastic resin is injected.

An electrode assembly is put in a battery case manufactured using the mold 400, the upper case and the lower case are coupled to each other, an electrolyte is injected into the battery case, and opposite surfaces of the upper case and the lower case are thermally fused to seal the battery case.

FIG. 6 is a perspective view showing a mold for manufacturing an integrated secondary battery as shown in FIG. 4.

Referring to FIG. 6, the mold, denoted by reference numeral 500, includes an upper mold 510 and a lower mold 520. A space for receiving an electrode assembly 530 is defined in each of the upper mold 510 and the lower mold 520. The upper and lower molds 510 and 520 are coupled to each other in the state in which the electrode assembly 530 is received in the spaces, and a thermoplastic resin is injected into the mold through thermoplastic resin injection ports 521.

The thermoplastic resin forms an integrated battery case configured to surround the entire outer surface of the electrode assembly 530.

The outer surface of the electrode assembly 530 may not be treated at all, or an aluminum tape may be attached to at least a portion of the outer surface of the electrode assembly. In addition, the thermoplastic resin may not include any additive, or may include a hygroscopic additive.

Those skilled in the art to which the present invention pertains will appreciate that various applications and modifications are possible based on the above description, without departing from the scope of the present invention.

INDUSTRIAL APPLICABILITY

As is apparent from the above description, a secondary battery according to the present invention includes a battery case made of a thermoplastic resin, which can be injection-molded, wherein the battery case is provided therein with a space for receiving an electrode assembly and an electrolytic material. Even in the case in which the thickness of the electrode assembly is increased, the size of a mold for injection molding may be adjusted in order to receive the thick electrode assembly, whereby it is possible to manufacture a secondary battery having a large capacity and high energy density.

In addition, an additional process of forming the battery case or a thermal fusion process using a pressing member is not required, whereby a manufacturing process is simplified and thus productivity is improved.

In addition, the thermoplastic resin, which constitutes the battery case, may include a hygroscopic additive, or an aluminum tape may be attached to the outer surface of the electrode assembly, whereby it is possible to prevent foreign matter from being introduced into the electrode assembly.

The invention claimed is:

1. A secondary battery in which an electrode assembly is received in a battery case together with an electrolytic material,
   wherein an aluminum tape is attached to at least a portion of a surface of the electrode assembly,
   wherein the battery case is provided therein with a space for receiving the electrode assembly and the electrolytic material,
   wherein the electrode assembly and the electrolytic material are disposed within the battery case such that the electrolytic material contacts the battery case,
   wherein the battery case is made of a thermoplastic resin and does not include metal,
   wherein the thermoplastic resin comprises a hygroscopic additive, and
   wherein the battery case is injection molded such that the battery case has no seam on an outer surface thereof with the thermoplastic resin surrounding the entire outer surface of the electrode assembly and the electrode assembly completely enclosed by the battery case, such that only electrode terminals protruding from the electrode assembly extend outwards from the battery case.

2. The secondary battery according to claim 1, wherein the electrolytic material is liquid or solid.

3. The secondary battery according to claim 1, wherein the thermoplastic resin is at least one selected from a group consisting of polyvinyl alcohol, polyethylene, polypropylene, polystyrene, acrylonitrile butadiene styrene copolymer (ABS), polyamide, polyvinyl chloride, acryl, fluorine resin, and polyethylene terephthalate.

4. The secondary battery according to claim 1, wherein the electrolytic material is solid.

5. The secondary battery according to claim 1, wherein the battery case is made of a material consisting essentially of the thermoplastic resin and the hygroscopic additive.

6. A secondary battery comprising:
   an electrode assembly;
   an aluminum tape is attached to at least a portion of a surface of the electrode assembly;
   an electrolytic material; and
   a battery case having an integrated structure made of injection molded thermoplastic resin such that the battery case has no seam on an outer surface thereof with the thermoplastic resin surrounding an entire outer surface of the electrode assembly and the electrode assembly completely enclosed by the battery case, such that only electrode terminals protruding from the electrode assembly extend outwards from the battery case, the battery case provided therein with a space for receiving the electrode assembly and the electrolytic material, wherein the thermoplastic resin comprises a hygroscopic additive.

7. A method of manufacturing a secondary battery, the method comprising:
   preparing a mold for manufacturing a battery case having therein a space for receiving an electrode assembly;
   attaching an aluminum tape to surround at least a portion of a surface of an electrode assembly;
   placing the electrode assembly in the mold;
   injecting a thermoplastic resin into the mold, in which the electrode assembly and an electrolytic material are placed, to form the battery case having the electrode assembly and the electrolytic material placed therein such that the electrolytic material contacts the battery case, such that the battery case has no seam on an outer surface thereof with the thermoplastic resin surrounding the entire outer surface of the electrode assembly and the electrode assembly completely enclosed by the battery case, such that only electrode terminals protruding from the electrode assembly extend outwards from the battery case, wherein the battery case does not include metal, and wherein the thermoplastic resin comprises a hygroscopic additive; and
   separating the battery case from the mold.

8. The method according to claim 7, wherein the electrode assembly is configured to have a structure in which the electrolytic material is a solid electrolyte interposed between a positive electrode and a negative electrode.

* * * * *